(12) United States Patent
Tanigawa

(10) Patent No.: US 8,794,101 B2
(45) Date of Patent: Aug. 5, 2014

(54) FLOOR MOUNTED PEDAL SYSTEM FOR A VEHICLE

(75) Inventor: Masahiko Tanigawa, Hirakata (JP)

(73) Assignee: Komatsu Ltd., Tokyo (JP)

( * ) Notice: Subject to any disclaimer, the term of this patent is extended or adjusted under 35 U.S.C. 154(b) by 570 days.

(21) Appl. No.: 12/937,580

(22) PCT Filed: Feb. 26, 2009

(86) PCT No.: PCT/JP2009/000857
§ 371 (c)(1),
(2), (4) Date: Oct. 13, 2010

(87) PCT Pub. No.: WO2009/128195
PCT Pub. Date: Oct. 22, 2009

(65) Prior Publication Data
US 2011/0041645 A1    Feb. 24, 2011

(30) Foreign Application Priority Data

Apr. 14, 2008  (JP) .................................. 2008-104520

(51) Int. Cl.
*G05G 1/44* (2008.04)
*B60K 26/02* (2006.01)
*B60N 3/06* (2006.01)
*G05G 1/405* (2008.04)
*G05G 1/60* (2008.04)

(52) U.S. Cl.
CPC ............... *B60K 26/02* (2013.01); *B60N 3/063* (2013.01); *G05G 1/405* (2013.01); *G05G 1/60* (2013.01)
USPC ............................................. 74/512; 74/564

(58) Field of Classification Search
CPC ........ B60K 26/02; B60N 3/063; G05G 1/405; G05G 1/60
USPC ..................... 74/564, 512–514, 560; D12/174
IPC .......................................................... B60N 2/44
See application file for complete search history.

(56) References Cited

U.S. PATENT DOCUMENTS 1,480,421 A  *  1/1924  Smith .............................. 74/564
1,516,862 A  *  11/1924  Loury .............................. 74/564

(Continued)

FOREIGN PATENT DOCUMENTS

CN          1711513 A      12/2005
JP          64-46819 U      3/1989

(Continued)

OTHER PUBLICATIONS

International Search Report dated May 19, 2009 issued in International Appln. No. PCT/JP2009/000857.

(Continued)

*Primary Examiner* — Vinh Luong
(74) *Attorney, Agent, or Firm* — Holtz Holtz Goodman & Chick PC

(57) ABSTRACT

A foot support installed on a floor panel of an operator cab has a rear surface section that rises upward in a rear-to-front direction of the operator cab and an upper surface section that is provided in front of the rear surface section so as to continue therefrom and slopes downward in the rear-to-front direction of the operator cab. A heel position adjusting plate having a heel rest portion is mounted such that the relative distance of the heel rest portion with respect to the foot support is adjustable.

4 Claims, 3 Drawing Sheets

(56) References Cited

U.S. PATENT DOCUMENTS

| | | | | |
|---|---|---|---|---|
| 1,698,140 | A | * | 1/1929 | Maud .............................. 74/564 |
| 1,801,609 | A | * | 4/1931 | Nielsen ........................... 74/564 |
| 1,826,968 | A | * | 10/1931 | Townsend et al. .............. 74/513 |
| 1,893,681 | A | * | 1/1933 | Rabbes ............................ 74/564 |
| 2,139,010 | A | * | 12/1938 | Franks, Jr. ..................... 477/216 |
| 2,915,917 | A | * | 12/1959 | Kent ............................... 74/564 |
| 2,931,246 | A | * | 4/1960 | Lerman ........................... 74/516 |
| D208,403 | S | * | 8/1967 | Bisanar ........................ D12/174 |
| 6,318,785 | B1 | * | 11/2001 | Tousignant ..................... 296/75 |
| 7,841,640 | B2 | * | 11/2010 | Bowen ............................ 296/75 |
| 8,469,138 | B1 | * | 6/2013 | Koehler ........................ 180/315 |
| 2006/0169092 | A1 | | 8/2006 | Terradas et al. |
| 2012/0137824 | A1 | * | 6/2012 | Himanen ........................ 74/560 |
| 2013/0092858 | A1 | * | 4/2013 | Sakatani ....................... 251/231 |

FOREIGN PATENT DOCUMENTS

| | | | |
|---|---|---|---|
| JP | 04-146824 A | 5/1992 | |
| JP | 6-25913 U | 4/1994 | |
| JP | 6-78053 U | 11/1994 | |
| JP | 2000-284846 A | 10/2000 | |
| JP | 2001-279720 A | 10/2001 | |
| JP | 2005-271829 A | 10/2005 | |
| JP | 2007-109162 A | 4/2007 | |
| WO | WO 2005/077709 | * 8/2005 | ............... B60N 2/44 |

OTHER PUBLICATIONS

International Preliminary Report on Patentability dated Nov. 30, 2010 (in English) in parent International Application No. PCT/JP2009/000857.

Chinese Office Action dated Aug. 29, 2012 (and English translation thereof) in counterpart Chinese Application No. 200980112293.X.

Japanese Office Action dated Jan. 22, 2013 (and English translation thereof) in counterpart Japanese Application No. 2008-104520.

* cited by examiner

FLOOR MOUNTED PEDAL SYSTEM FOR A VEHICLE

This application is a U.S. National Phase Application under 35 USC 371 of International Application PCT/JP2009/000857 filed Feb. 26, 2009.

TECHNICAL FIELD

The invention relates to a floor mounted pedal system for a vehicle, the system being of the type installed on the floor surface of a vehicle operator cab. More particularly, the invention relates to a floor mounted pedal system for a vehicle particularly suited for use as a decelerator pedal system of a work vehicle such as a bulldozer.

BACKGROUND ART

In a known pedal system, a foot operated pedal, operable with an operator's toe pressed thereagainst, is pivotally mounted on a foot support that is installed on the floor surface of a vehicle operator cab, for supporting a heel part of the operator (See Patent Document 1). There has been known another technique according to which a foot operated pedal is constituted by a lower pedal and an upper pedal that is mounted over the lower pedal so as to be adjustably movable between a plurality of positions in relation to the lower pedal and the angle of the operator's foot relative to the foot operated pedal is varied by adjusting the position of the upper pedal relative to the lower pedal (See e.g., Patent Document 2).

Patent Document 1: JP-A-2007-109162
Patent Document 2: JP-UM-A-6-78053

The pedal system disclosed in Patent Document 1 suffers from the problem that it does not use a means for adjusting the angle of the foot relative to the foot operated pedal and therefore has poor pedal operability depending on the physical size of the operator and causes great fatigue to the operator.

Although the technique of Patent Document 2 may conceivably be applied to the pedal system of Patent Document 1, this case involves a double structure composed of the lower pedal and the upper pedal placed thereon and, in addition, entails structural complications because the upper pedal has to be adjustably movable between a plurality of positions in relation to the lower pedal.

DISCLOSURE OF THE INVENTION

Problems that the Invention Intends to Solve

The invention is directed to overcoming the foregoing problems and an object of the invention is therefore to provide a floor mounted pedal system for a vehicle, that is capable of adjusting the angle of an operator's foot relative to a foot operated pedal with a simple structure.

Means of Solving the Problems

The above object can be achieved by a floor mounted pedal system for a vehicle according to the invention, which system comprises:

a foot support installed on a floor surface of an operator cab for supporting a heel part of an operator, the foot support having a rear surface section that rises upward in a rear-to-front direction of the operator cab and an upper surface section that is provided in front of the rear surface section so as to continue therefrom and slopes downward in the rear-to-front direction of the operator cab;

a foot operated pedal provided so as to be freely pivotable relative to the foot support and operable with a toe of the operator pressed thereagainst; and a heel position adjusting plate that has a heel rest portion for receiving the operator's heel part rested thereon and that is mounted on the upper surface section of the foot support such that the relative distance of the heel rest portion with respect to the rear surface section of the foot support is adjustable.

Preferably, the heel rest portion of the invention has a first rest surface rising upward in the rear-to-front direction of the operator cab; and a second rest surface that is provided in front of the first rest surface so as to continue therefrom and has a smaller tilt angle with respect to the floor surface of the operator cab than the first rest surface.

Herein, the first rest surface is preferably inclined in a direction substantially parallel to the rear surface section of the foot support.

In addition, the heel rest portion may have a plate mounting portion that is provided in front of the second rest surface so as to continue therefrom and fixed to the upper surface section of the foot support.

Effects of the Invention

According to the invention, the heel position adjusting plate having the heel rest portion for receiving an operator's heel part rested thereon is mounted on the foot support such that the relative distance of the heel rest portion with respect to the foot support is adjustable. With this arrangement, the relative distance between the foot support and the heel part and, in consequence, the angle of the foot relative to the foot operated pedal can be adjusted. This operational effect can be achieved by such a simple structure that the heel position adjusting plate having the heel rest portion is mounted on the foot support such that the relative distance of the heel rest portion with respect to the foot support is adjustable.

Herein, the heel rest portion has the first rest surface that rises upward in the rear-to-front direction of the operator cab and the second rest surface that is provided in front of the first rest surface so as to continue therefrom and has a smaller tilt angle with respect to the floor surface of the operator cab than the first rest surface. This provides the following effect: When the foot operated pedal is in its neutral position without being pushed at all, the heel part is received mainly by the first rest surface. As the operator presses the foot operated pedal with his foot, the rest surface where the operator's heel part is rested is shifted from the first rest surface to the second rest surface, and when the foot operated pedal is fully pushed to the fully operated position, the operator's heel part is received mainly by the second rest surface. Therefore, the operator's foot can be stably supported throughout the entire range of movement of the foot operated pedal, so that more stable pedal operation can be achieved.

It should be noted that the part ranging from the heel to arc of a foot is generically referred to as a "heel part" herein. Whereas the operator's heel is generally rested on the heel rest portion of the heel position adjusting plate, the arc of the foot may be rested on the heel rest portion of the heel position adjusting plate in some cases, depending on the physical size (foot size) of the operator.

BRIEF DESCRIPTION OF DRAWINGS

FIG. 3 is a left side view of the decelerator pedal system of the embodiment, in which FIG. 3(a) shows, in broken view, the left side of a foot support and FIG. 3(b) shows a portion viewed in the direction of an arrow A of FIG. 3(a).

REFERENCE NUMERALS

Figure 1:
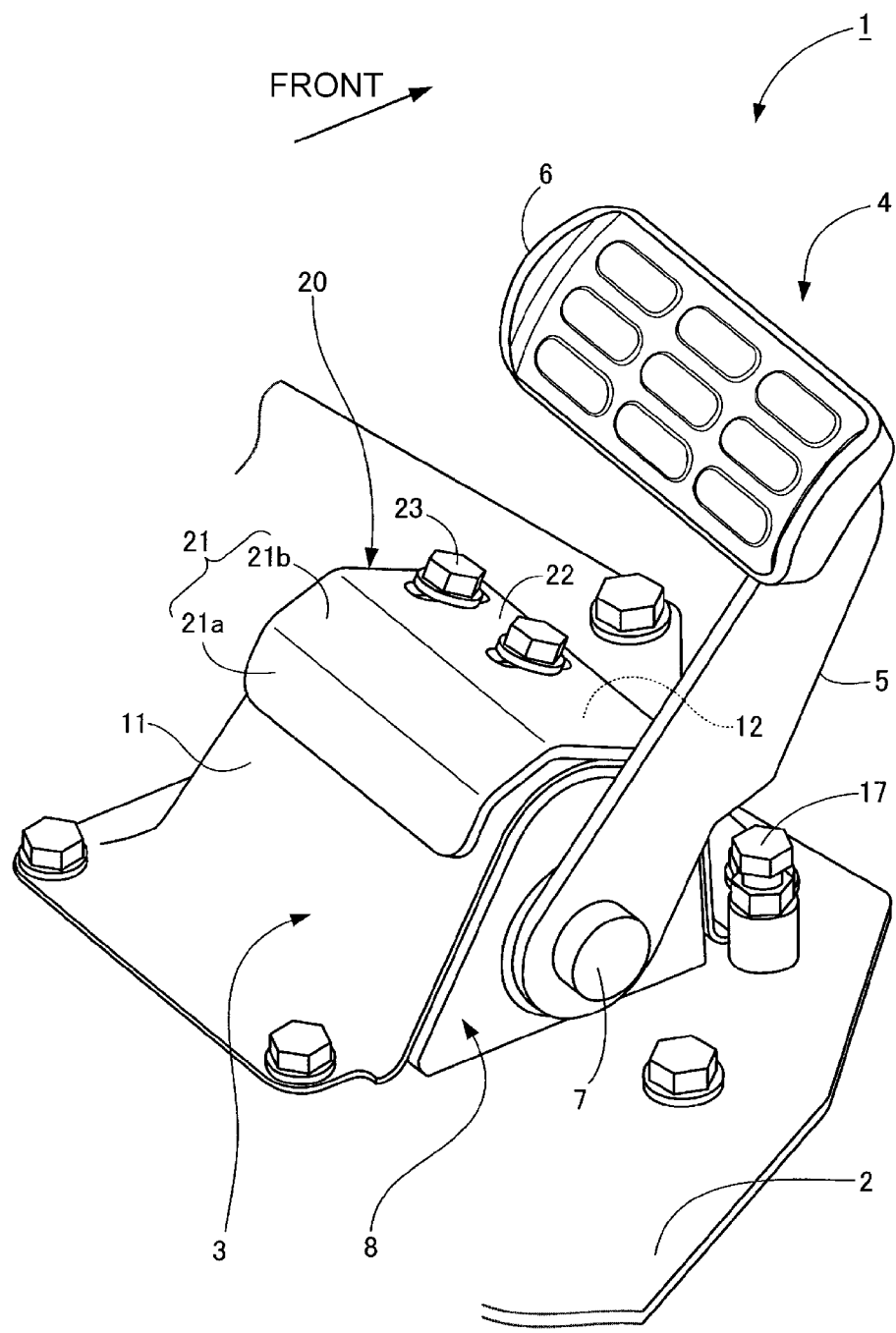
FIG. 1 is a total external appearance perspective view of a decelerator pedal system according to an embodiment of the invention.

1: decelerator pedal system (floor mounted pedal system for a vehicle)
2: floor panel
3: foot support
4: decelerator pedal (foot operated pedal)
11: rear surface section
12: upper surface section
20: heel position adjusting plate
21: heel rest portion
21a: first rest surface
21a: second rest surface

BEST MODE FOR CARRYING OUT THE INVENTION

Referring now to the accompanying drawings, the floor mounted pedal system for a vehicle of the invention will be described according to a preferred embodiment. It should be noted that although the following embodiment is explained with a case where the invention is applied to a floor mounted pedal system installed in the operator cab of a bulldozer and, in particular, a decelerator pedal system for diminishing engine rotational speed, the invention is not limited to this but applicable to any type of pedal system as long as a foot operated pedal is pivotally mounted on the floor surface of the operator cab of a vehicle through a foot support.

Figure 2:
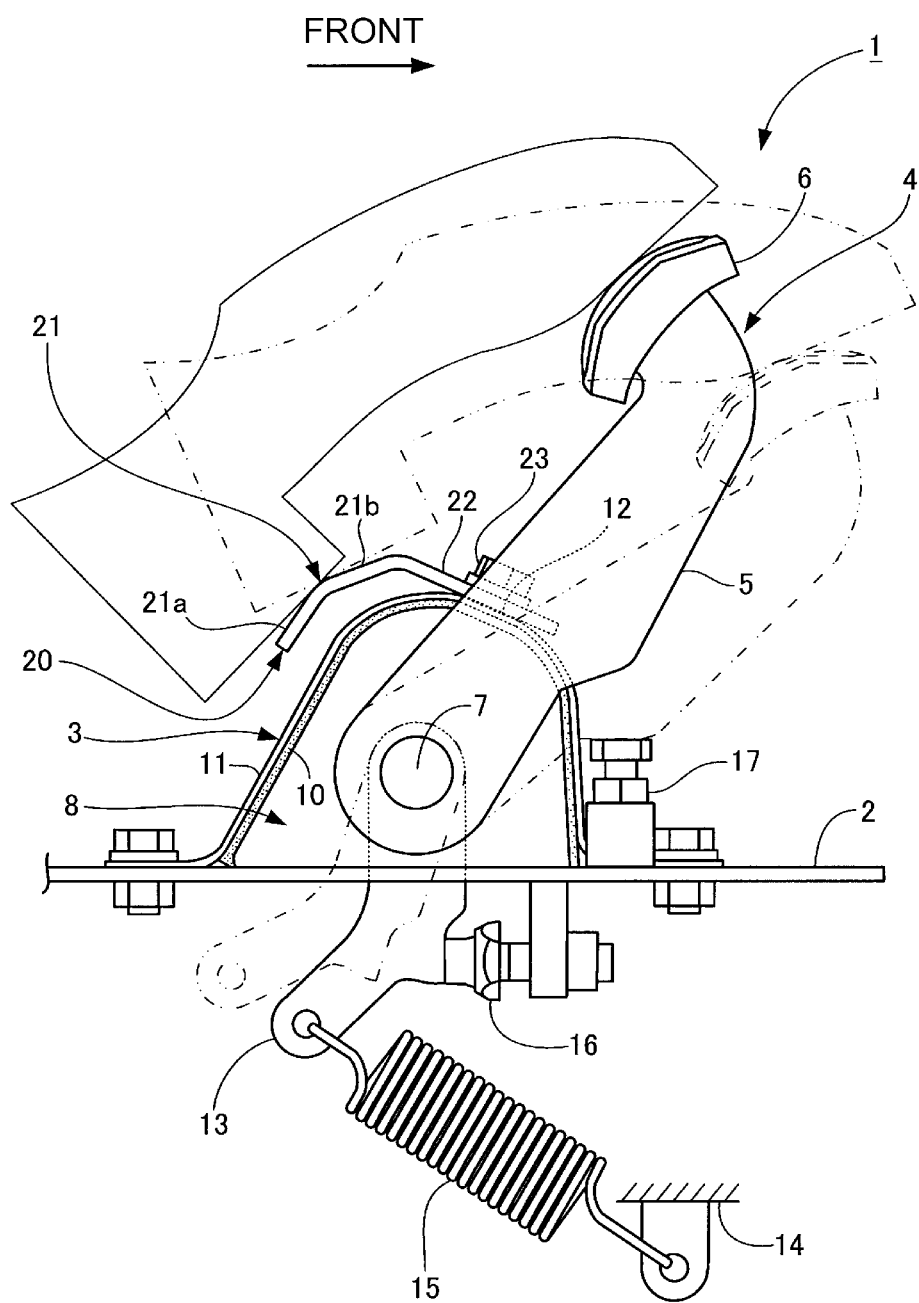
FIG. 2 is a right side view of the decelerator pedal system of the embodiment.
Figure 3:
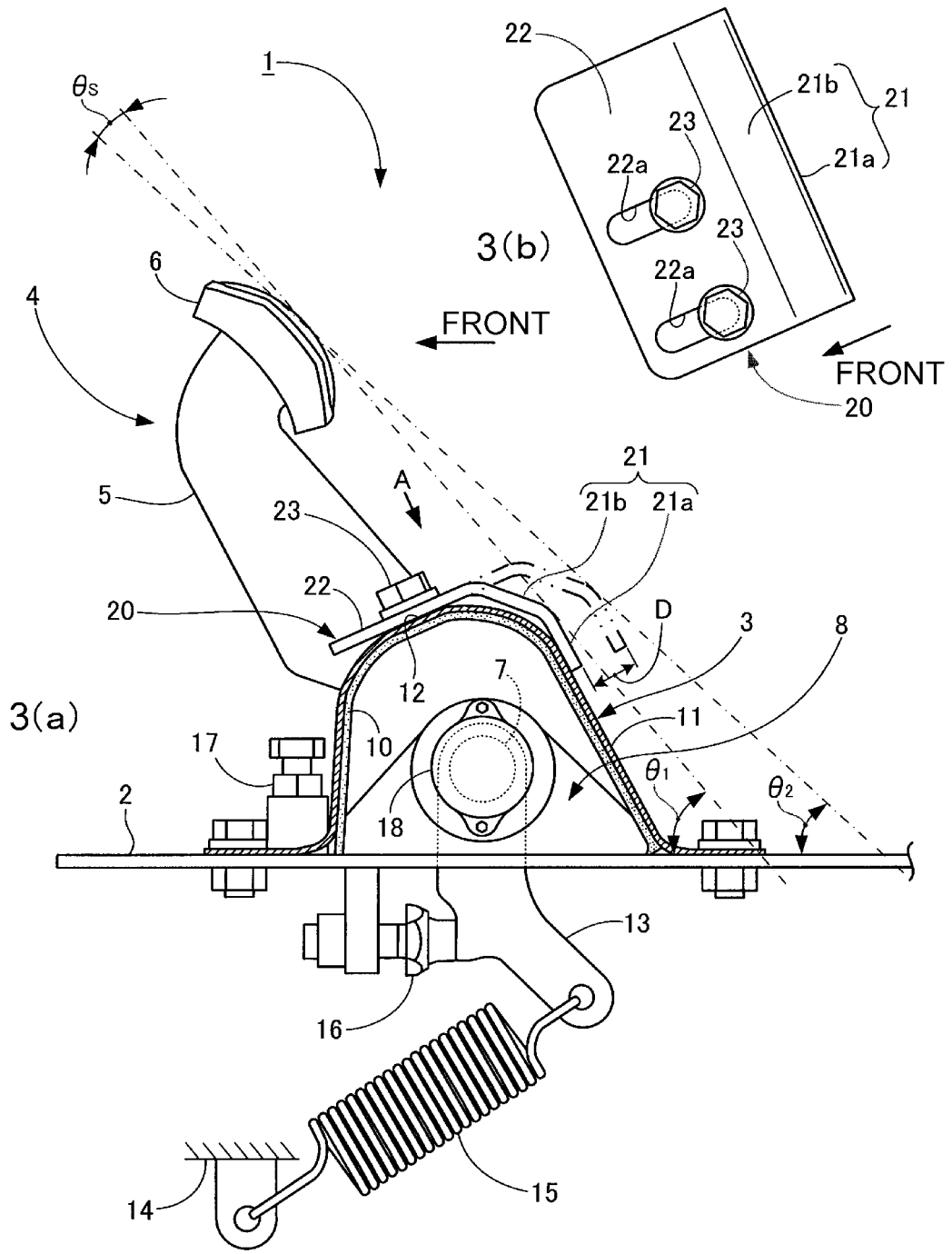

FIGS. 1 and 2 show a total external appearance perspective view and a right side view, respectively, of a decelerator pedal system according to an embodiment of the invention. FIG. 3 is a left side view of the same decelerator pedal system, in which FIG. 3(a) shows, in broken view, the left side of a foot support and FIG. 3(b) shows a portion viewed in the direction of the arrow A of FIG. 3(a).

The decelerator pedal system 1 shown in FIG. 1 has a foot support 3 installed on a floor panel 2 for supporting a heel part of the operator which floor panel 2 constitutes the floor surface of the operator cab of the bulldozer; and a foot operated pedal (hereinafter referred to as a "decelerator pedal") 4 that is installed so as to be pivotable relative to the foot support 3.

The decelerator pedal 4 is composed of a pedal lever 5 diagonally extending upward in a rear-to-front direction of the operator cab and a toe rest portion 6 formed on the leading end of the pedal lever 5 so as to be integral therewith, for receiving a toe of the operator pressed thereagainst. Fixed to the pivotal end of the pedal lever 5 is a pedal turning shaft 7 that extends to the left, making a right angle with the pedal lever 5.

The foot support 3 is disposed so as to cover a shaft support member 8 except the right side face thereof, the shaft support member 8 being for supporting the pedal turning shaft 7 so as to allow pivoting of the pedal turning shaft 7. This foot support 3 has a rear surface section 11 that rises upward in a rear-to-front direction of the operator cab and an upper surface section 12 that is disposed in front of the rear surface section 11 so as to continue therefrom, sloping downward in the rear-to-front direction of the operator cab.

The foot support 3 of the above structure is assembled in such a way that the shaft support member 8 is fixedly mounted on the floor panel 2 and then the foot support 3 is securely mounted on the floor panel 2, being laid on the shaft support member 8 with a sealing member 10 (see FIG. 2) therebetween.

As illustrated in FIG. 2, a link lever 13 is fixed to the pedal turning shaft 7 at an axially intermediate position thereof. A tension coil spring 15 is suspended between the free end of the link lever 13 and a fixed member 14 provided under the floor panel 2. The decelerator pedal 4 is energized by the tension coil spring 15 in a direction opposite to its pedaling direction.

Provided under the floor panel 2 is a first stopper 16 that serves both to adjust the non-operated state position (neutral position) of the decelerator pedal 4 designated by solid line in FIG. 2 and to stop the decelerator pedal 4 at the neutral position. Provided on the upper surface of the floor panel 2 is a second stopper 17 that serves both to adjust the fully operated position of the decelerator pedal 4 designated by dashed-two dotted line in FIG. 2 and to stop the decelerator pedal 4 at the fully operated position.

As shown in FIG. 3(a), the left side face of the shaft support member 8 is provided with a potentiometer 18 for detecting the rotational angle of the pedal turning shaft 7. A rotational angle detection signal issued from the potentiometer 18 is sent to a controller (not shown) and then the controller controls the jet of fuel to the engine so as to reduce engine rotational speed in response to the rotational angle detection signal. In this way, the rotational speed of the engine can be reduced in accordance with the operation of the decelerator pedal 4.

Attached to the foot support 3 is a heel position adjusting plate 20. The heel position adjusting plate 20 has a heel rest portion 21 for receiving a heel part of the operator rested thereon and a plate mounting portion 22 that is engaged with the upper surface section 12 of the foot support 3.

A first rest surface 21a and a second rest surface 21b are formed in the heel rest portion 21 by applying a desired bending process, such that the first rest surface 21a rises upward in a rear-to-front direction of the operator cab, being substantially parallel with the rear surface section 11 of the foot support 3, whereas the second rest surface 21b is disposed in front of the first rest surface 21a so as to continue therefrom and has smaller tilt angle relative to the floor panel 2 than the first rest surface 21a. As illustrated in FIG. 3(b), the plate mounting portion 22 is provided with a pair of elongated holes 22a that extend in a longitudinal direction and are spaced at a specified distance apart in a lateral direction.

As illustrated in FIGS. 3(a) and 3(b), the heel position adjusting plate 20 can be fixed to the foot support 3 by clamping with bolts 23 that are screwed into the upper surface section 12 of the foot support 3 through the elongated holes 22a. The heel rest portion 21 can be moved close to and away from the foot support 3 by moving the heel position adjusting plate 20 while the bolts 23 being loosened. Thus, the relative distance of the heel rest portion 21 with respect to the foot support 3 can be arbitrarily adjusted between the foremost position designated by solid line in FIG. 3(a) and the rearmost position designated by dashed-two dotted line in FIG. 3(a), the foremost position being such a position that the heel position adjusting plate 20 is moved forward until the first rest surface 21a of the heel rest portion 21 comes into contact with the rear surface section 11 of the foot support 3, whereas the rearmost position is such that the heel position adjusting plate 20 is moved backward a specified distance D from the foremost position.

In the decelerator pedal system 1 of the above-described structure, when the heel position adjusting plate 20 is situated at the foremost position designated by solid line in FIG. 3(a), the foot of the operator is at a specified angle $\theta_1$ in relation to the floor panel 2. When the heel position adjusting plate 20 is situated at the rearmost position designated by dashed-two dotted line in FIG. 3(a), the foot of the operator is at a specified angle $\theta_2$ in relation to the floor panel 2.

According to the decelerator pedal system 1 of this embodiment, the angle of the foot of the operator relative to the decelerator pedal 4 can be controlled within the range of a specified angle $\theta_s$ ($=\theta_1-\theta_2$) by adjusting the relative distance of the heel rest portion 21 with respect to the foot support 3 through the back and forth movement of the heel position adjusting plate 20. Therefore, the angle of the foot relative to the decelerator pedal 4 can be set optimally in accordance with the physical size of the operator so that good fine-operation performance especially necessary for the decelerator pedal system 1 can be ensured irrespective of the physical size of the operator.

Further, according to the decelerator pedal system 1 of this embodiment, when the decelerator pedal 4 is in its neural position designated by solid line in FIG. 2, the heel part is mainly received by the first rest surface 21a as illustrated in FIG. 2. As the decelerator pedal 4 is forwardly pressed down, the rest surface for receiving the heel part is shifted from the first rest surface 21a to the second rest surface 21b and when the decelerator pedal 4 is placed in its fully operated position designated by dashed-two dotted line in FIG. 2, the heel part is mainly received by the second rest surface 21b. This allows the heel part to be stably supported throughout the entire range of movement of the decelerator pedal 4, providing more stable pedal operation.

Although the floor mounted pedal system for a vehicle of the invention has been described according to one embodiment thereof, the invention is not necessarily limited to the particular configuration discussed in the embodiment shown herein and various changes and modifications are made to the configuration without departing from the spirit and scope of the invention.

Industrial Applicability

The floor mounted pedal system for a vehicle of the invention is suitably applicable as a decelerator pedal system installed in the operator cab of a bulldozer, for reducing the rotational speed of the engine.

The invention claimed is:

1. A floor mounted pedal system for a vehicle, the system comprising:
    a foot support installed on a floor surface of an operator cab, the foot support having a rear surface section that rises upward in a rear-to-front direction of the operator cab and an upper surface section that is provided in front of the rear surface section so as to continue therefrom and slopes downward in the rear-to-front direction of the operator cab;
    a foot operated pedal which pivots relative to the foot support; and
    a heel position adjusting plate that has a heel rest portion and that is movably mounted on the upper surface section of the foot support such that a relative distance between the heel rest portion and the rear surface section of the foot support is adjustable in the rear-to-front direction of the operator cab,
    wherein the foot operated pedal comprises:
        a pedal turning shaft which is positioned substantially inside the foot support, and which extends in a direction that crosses the rear-to-front direction of the operator cab;
        a pedal lever which is positioned at a lateral side of the foot support, and which has a pivotal end that is fixed to the pedal turning shaft; and
        a toe rest portion that is provided on a leading end of the pedal lever.

2. The floor mounted pedal system for a vehicle according to claim 1, wherein the heel rest portion comprises:
    a first rest surface rising upward in the rear-to-front direction of the operator cab; and
    a second rest surface that is provided in front of the first rest surface so as to continue therefrom and has a smaller tilt angle with respect to the floor surface of the operator cab than the first rest surface.

3. The floor mounted pedal system for a vehicle according to claim 2, wherein the first rest surface is inclined in a direction substantially parallel to the rear surface section of the foot support.

4. The floor mounted pedal system for a vehicle according to claim 2, wherein the heel rest portion further comprises a plate mounting portion that is provided in front of the second rest surface so as to continue therefrom and fixed to the upper surface section of the foot support.

* * * * *